US008538378B2

(12) United States Patent
Golds

(10) Patent No.: US 8,538,378 B2
(45) Date of Patent: Sep. 17, 2013

(54) MOBILE BILLBOARD AND USAGE ADVISOR

(75) Inventor: David Golds, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 948 days.

(21) Appl. No.: 12/040,864

(22) Filed: Feb. 29, 2008

(65) Prior Publication Data
US 2009/0054030 A1 Feb. 26, 2009

Related U.S. Application Data

(60) Provisional application No. 60/968,007, filed on Aug. 24, 2007.

(51) Int. Cl.
*H04M 11/00* (2006.01)

(52) U.S. Cl.
USPC ........... 455/406; 455/437; 455/561; 455/522; 370/235; 370/252; 370/328; 370/338

(58) Field of Classification Search
USPC ............. 455/405, 406, 432.1, 437, 561, 522; 370/235, 252, 328, 338
See application file for complete search history.

(56) References Cited

U.S. PATENT DOCUMENTS

| 5,303,297 | A | * | 4/1994 | Hillis ........................... 455/406 |
| 5,862,471 | A | | 1/1999 | Tiedemann, Jr. et al. |
| 5,915,214 | A | | 6/1999 | Reece et al. |
| 5,983,092 | A | | 11/1999 | Whinnett et al. |
| 6,101,379 | A | | 8/2000 | Rahman et al. |
| 6,151,309 | A | | 11/2000 | Busuioc et al. |
| 6,167,250 | A | | 12/2000 | Rahman et al. |
| 6,167,268 | A | | 12/2000 | Souissi et al. |
| 2004/0121758 | A1 | * | 6/2004 | Hoche et al. .................. 455/405 |
| 2004/0235455 | A1 | | 11/2004 | Jiang |
| 2005/0107065 | A1 | * | 5/2005 | Bernhart ....................... 455/405 |
| 2006/0041657 | A1 | | 2/2006 | Wen et al. |
| 2007/0026871 | A1 | | 2/2007 | Wager |
| 2007/0200862 | A1 | | 8/2007 | Uchiyama et al. |

OTHER PUBLICATIONS

Moonsider Mobile, "Monitor Your Cell Phone Usage with MinuteWatcher," available at http://www.moonsidermobile.com/monitor-your-cell-phone-usage-with-minutewatcher/, May 6, 2006, 3 pages.

Palmigiano, Alessandro, et al., "Technical Issues on Roaming Transparency, Technical Aspects and Data Overview related to the Proposed Regulation on Roaming," available at http://www.europarl.europa.eu/comparl/itre/pe382177en.pdf, Jan. 2007, 31 pages.

\* cited by examiner

*Primary Examiner* — Manpreet Matharu
(74) *Attorney, Agent, or Firm* — Senniger Powers LLP

(57) ABSTRACT

System for providing dynamic recommendations associated with usage of a wireless communication service from a service provider (SP) of a user. A memory area stores at least one or more of the following service usage information: a service plan of the wireless communication service of the user, a service charge structure of a wireless communication service, a service coverage area of the wireless communication service provider (SP), a usage information of the wireless communication service of the user, and tariff information associated with the usage. A processor is configured to execute computer-executable instructions for monitoring the usage of the wireless communication service. The processor is also configured to correlate the monitored usage with the service usage information stored on the memory area. The processor is configured to generate a recommendation based on the correlation of the monitored usage and the service usage information. The generated recommendation provides a cost analysis of using the wireless communication service by the user. An interface provides the generated recommendation associated with the usage to the user.

12 Claims, 11 Drawing Sheets

MOBILE BILLBOARD AND USAGE ADVISOR

CROSS REFERENCE OF RELATED APPLICATION

This application is a non-provisional of U.S. Provisional Patent Application Ser. No. 60/968,007, filed Aug. 24, 2007, the entire text of which is hereby incorporated by reference.

BACKGROUND

As the shift from using land lines to mobile phones happened during this past decade, the calling plans competition of the 90's is being redefined to suit the new ubiquitous mobile space and emerging technologies built on it. In the meantime, consumers are still struggling with surprise monthly bills (fear factor), roaming fees, costs of SMS messaging, ambiguity and complexity of the mobile bills and tariff especially those that travel frequently. Interestingly enough, users face even more problems and problems are even more complex as the mobile service provider continues to integrate with the web and is limiting the ability of the mainstream to take-up richer mobile scenarios.

It is found that Gartner estimates that the sales of mobile phone unit will exceed one billion by 2009. There are about 750+ major mobile network operators worldwide with no international regulation in place yet. From a consumer perspective, it is a very difficult problem to digest this data and make thrifty choices when simply wanting to make a phone call or send and SMS text message.

Furthermore, every individual or a group of individuals has certain unique needs based on their usage of mobile phones. Currently, users are unable to properly manage their usage or monitor their wireless service usage on an individual basis. Also, the mobile service provider is unwilling to provide adequate and timely cost-saving information to the user because it is not the mobile service provider's best interest to help the user in this aspect.

SUMMARY

Embodiments of the invention provide users with their plan optimization based on their specific scenarios. In addition, aspects of the invention solve this problem for the consumer or user by simplifying the data and choices into simple recommendations and also bring transparency into the costs associated with the various services. As such, embodiments of the invention provide recommendations about a user's services and cost-saving suggestions specific to the user's service, provide mobile-based tariff transparency application for services, and provide intelligent alerts agent for roaming and overages, WI-FI brokerage service, and optimization and usage tracking service.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
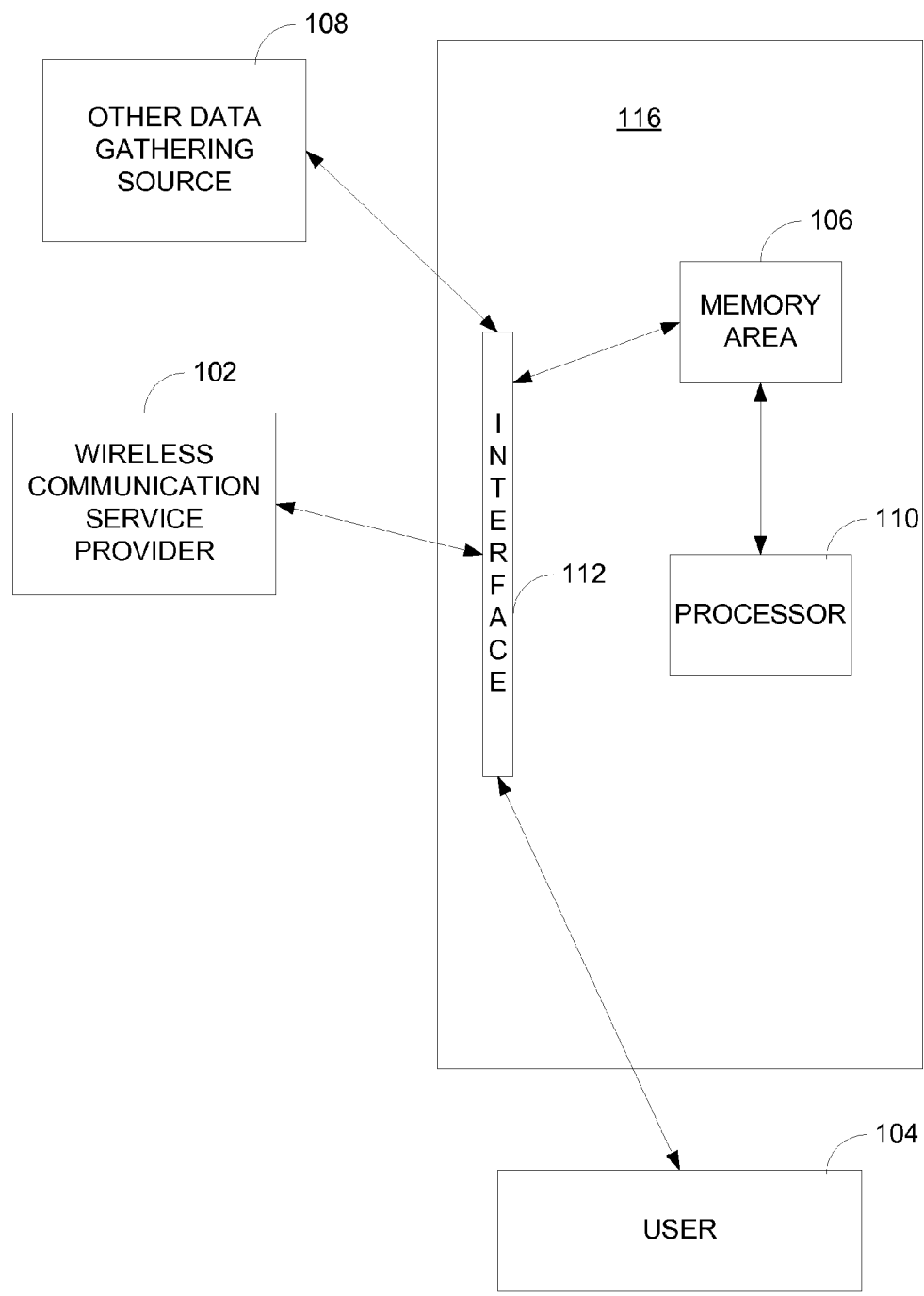
FIG. 1 is an exemplary diagram of a system for providing dynamic recommendations associated with usage of a wireless communication service from a service provider (SP) of a user according to an embodiment of the invention.

Some advantages of embodiments of the invention enhance the mobile devices to being the Point of Sale for buying and managing communication services—using usage-tracking agents on the mobile device, plus knowledge about the different tariffs and the user's currently selected network and plans. Aspects of the invention use the information to (a) provide the user with information about the cost of services, data and voice communications, (b) inform the user of changes in plans (roaming, overages etc), and (c) use this information to inform the user how to find the optimal plan for their short or long-term needs.

Aspects of the invention apply this knowledge to provide the user with information on the most cost-effective way to communicate and act as a broker for getting them connected to those services. This will require usage-tracking agents on the phone, plus knowledge about the different tariffs and the user's currently selected network & plans.

1. Tariff Transparency

In one embodiment, this may be a free service (however, data rates for devices still apply) to help users de-mystifying the costs associated with using our services such as email, contacts, instant messaging (IM), and calendar. In one embodiment, this information is provided to the users how much it will cost them to use each of these services based on their network providers.

2. Roaming and Overages Alerts

In one embodiment, this service includes two components. The first part includes a portal website that allows users to browse plans/apps, download, and purchase. The second component is a mobile device agent that would gather additional data like call & data usage, Wi-Fi networks the device has detected, as well as being able to provide a summary of usage to the user via a simple summary view.

It is focused on external factors affecting the users' costs and providing real-time alerts. The factors include roaming, going over their allowed minutes, changes in service providers tariffs, or detecting calls that are outside the boundary of the user' current plans such as making or receiving international calls. The system would also attempts to find more economical means of making phone calls. Here are some scenarios:

a. Data block: In one embodiment, aspects of the invention may attempt to throttle data relay; temporarily update user preferences; and detect when users are in and out when networking providers' coverage areas.

b. Alternative means of connection: In another embodiment, a recommendation of other service providers that are available is made, and aspects of the invention rank them based on cost or quality.

c. Voice over IP (VoIP) connecting both ends with service providers.

d. Conference calling: Facilitates conference calling.

3. Short Term Connections and Logistics

This service addresses short term savings opportunity for the users. For example, embodiments of the invention would alert the user about WIFI availability and help with the brokerage aspect and logistics. In cases where WIFI connections are not available, the service or systems embodiment aspects of the invention may suggest local service providers and offers to connect a user with the customer services department of these providers.

4. Long Term Tariff Optimization—Intelligent Agent

In one embodiment, this feature will be in the form of an intelligent agent that tracks usage habits of the user over time and formulates a profile of the user making suggestions about the most appropriate plans with their current network provider or other providers that maybe more adequate. The agent seeks to use the match the profile data to match users with better plans with the goal of reducing costs.

Referring now to FIG. 1, an exemplary diagram illustrates a system 100 for providing dynamic recommendations associated with usage of a wireless communication service from a service provider (SP) 102 of a user 104 according to an embodiment of the invention. The system 100 includes a memory area 106 for storing at least one or more of the following service usage information: a service plan of the wireless communication service of the user, a service charge structure of a wireless communication service, a service coverage area of the wireless communication service provider (SP) 102, a usage information of the wireless communication service of the user, and tariff information associated with the usage. In one embodiment, the service usage information may be input by the user 104. In another embodiment, the system 100 may obtain such information from the SP 102 directly. In a further embodiment, the system 100 may obtain such information from other data gathering source 108, such as a third-party wireless retail source.

The system 100 also includes a processor 110 having configured to execute computer-executable instructions for monitoring the usage of the wireless communication service by the user. For example, the processor 110 may be a processor in a server computer processing computer-executable instructions, codes, routines, applications, or the like. The processor 110 also executes computer-executable instructions for correlating the monitored usage with the service usage information stored on the memory area 106. The processor 110 generates a recommendation based on the correlation of the monitored usage and the service usage information. The generated recommendation provides a cost analysis of using the wireless communication service by the user. The system 100 also includes an interface 112 for providing the generated recommendation associated with the usage to the user.

Figure 3A:
FIGS. 3A to 3G are exemplary screen displays illustrating dynamic recommendations associated with usage of a wireless communication service from a service provider (SP) of a user according to an embodiment of the invention.
Figure 3B:
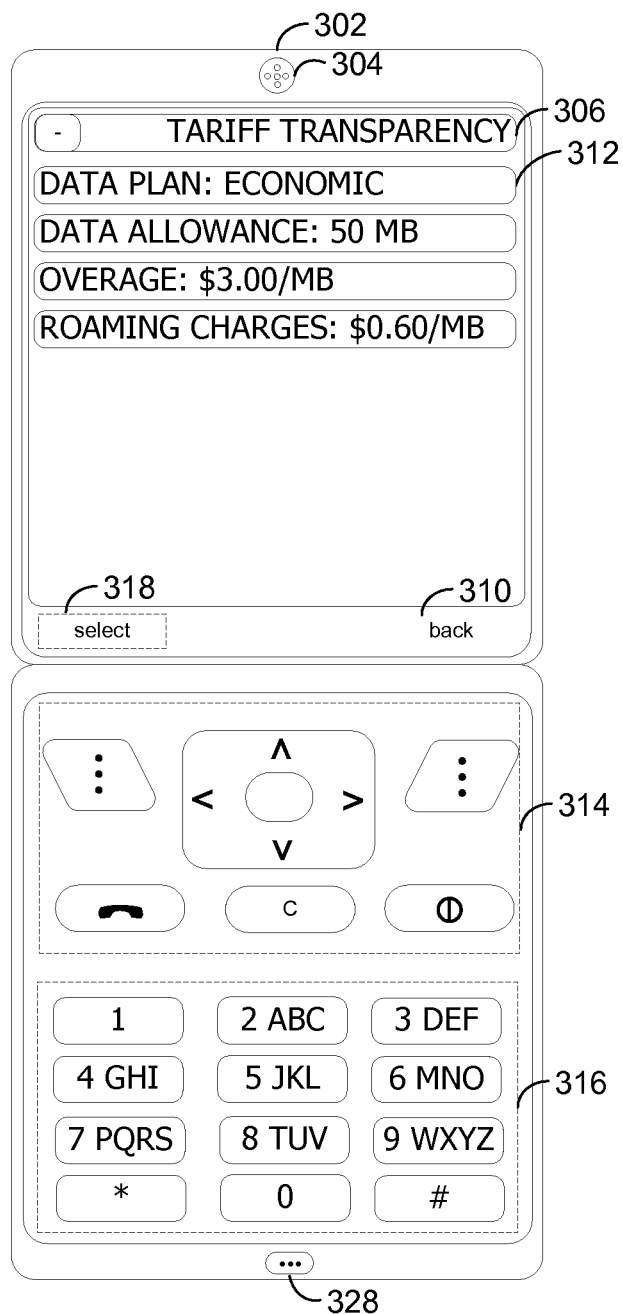
Figure 3C:
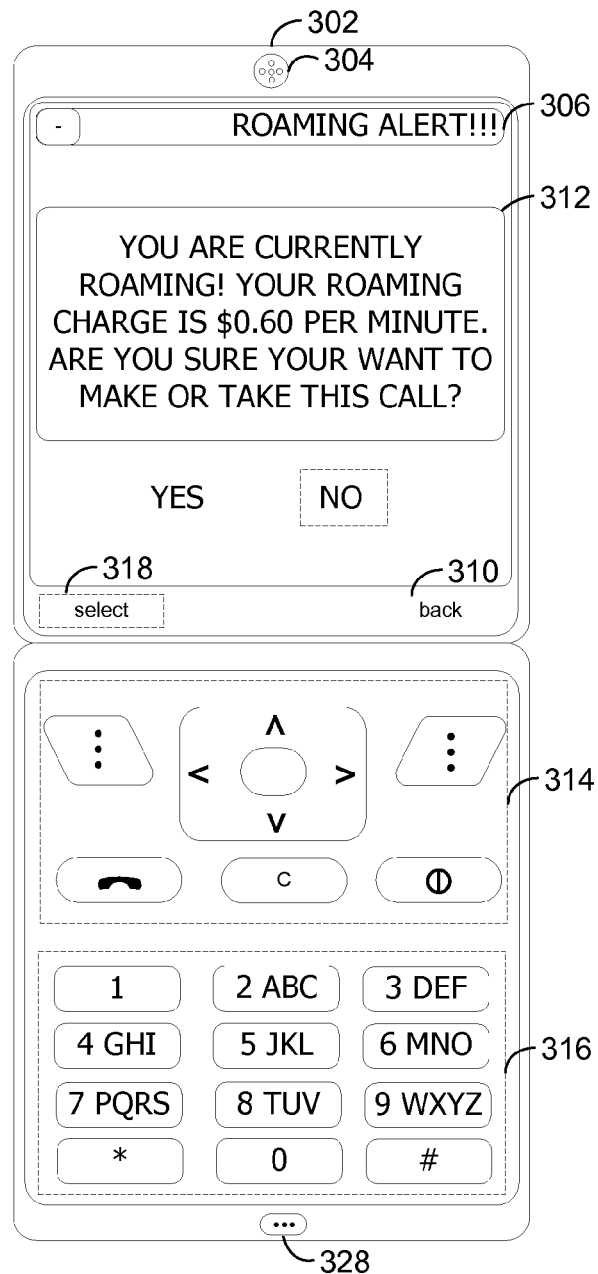
Figure 3D:
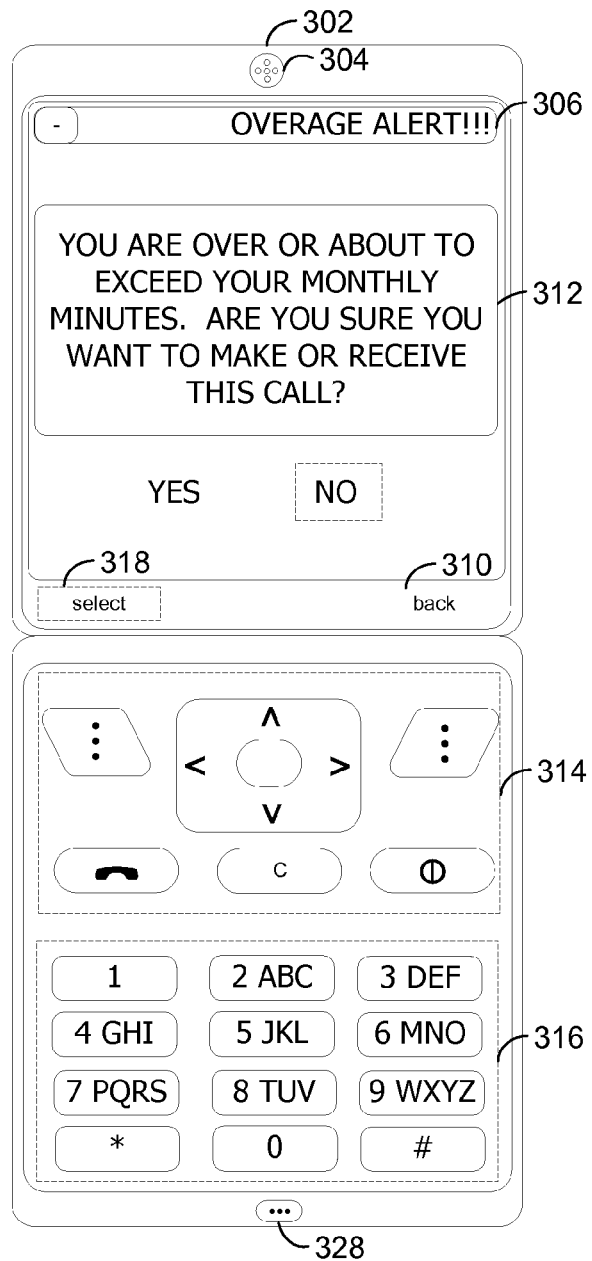
Figure 3E:
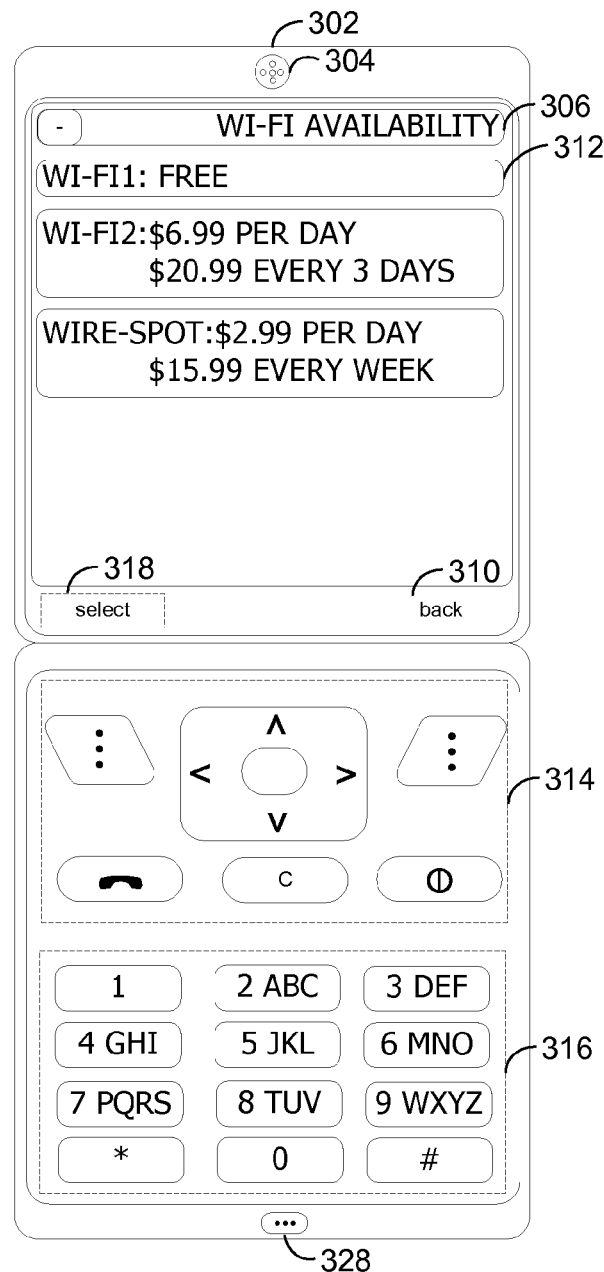
Figure 3F:
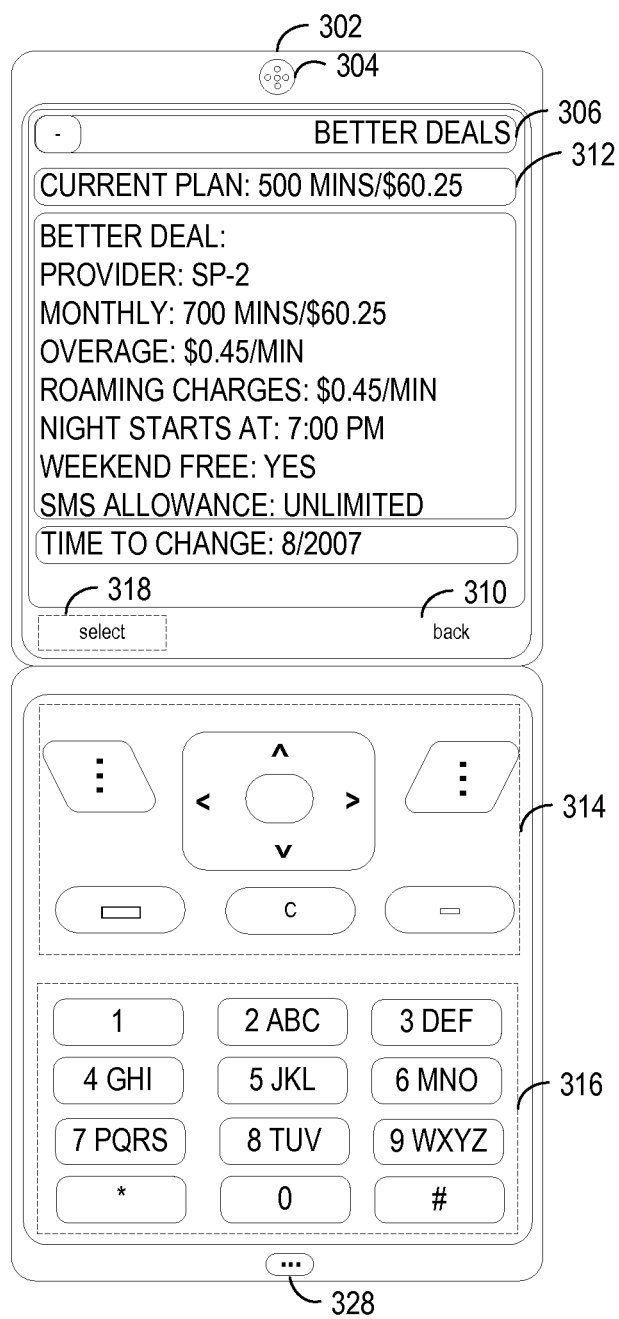

In another embodiment, the memory area 106 further stores service information relating to at least one service plan of a second SP, wherein the information relating to the at least one service plan of the second SP includes at least one or more of the following relating to the second SP: service plans, a service charge structure, a service coverage area, and tariff information. Similarly, the processor 110 may further configured to determine an estimate of a cost of the usage of the user based on the stored service information of the second SP. See also FIG. 3F.

In an alternative embodiment, the processor 110 is further configured to detect whether the monitored usage is outside the service coverage area and provide a notification during the monitored usage by the user in response to the detected usage. The notification is indicative of the usage being outside the service coverage area of the wireless communication SP of the user, and the interface 112 provides the notification to the user. For example, the notification includes an alert indicating to that user that the user is roaming outside the service coverage area and a cost estimate associated with using the wireless service while the user is roaming outside the service coverage area. See also FIG. 3C.

Figure 3G:
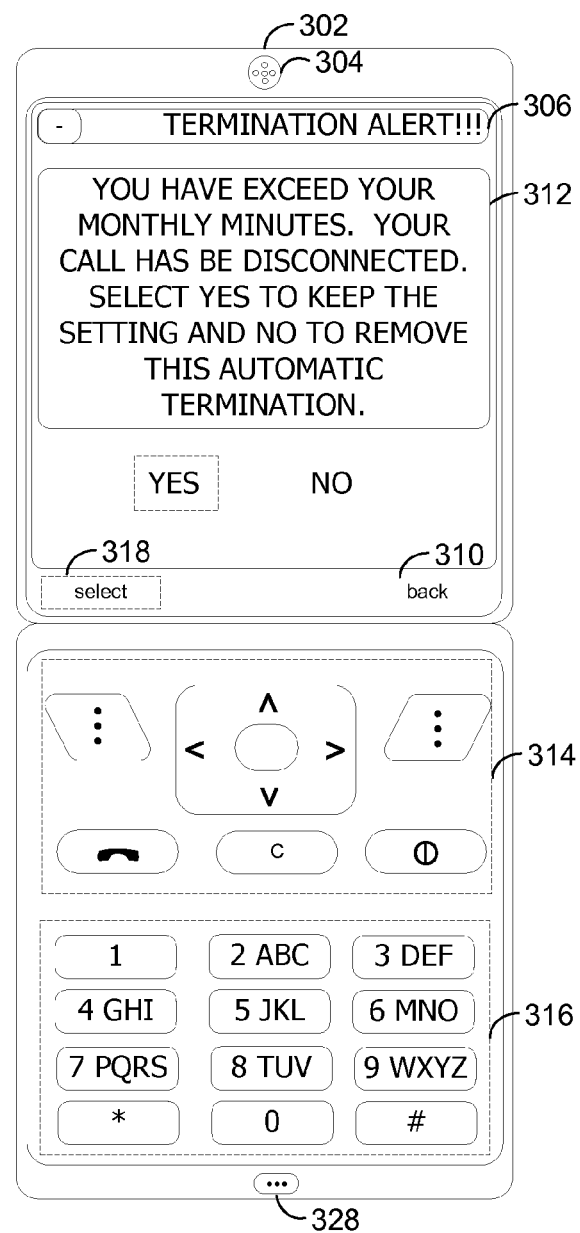

In a further alternative embodiment, the processor 110 may terminate a connection of the wireless communication service of the user as a function of the detected usage, the monitored usage, and the service plan information. See also FIG. 3G. Also, the processor 110 may further configured to establish a history of usage by the user and wherein the interface 112 provides a report of the history of usage to the user.

According to another aspect of the invention, the processor 110 is further configured to provide the notification to the user when the cost of the wireless communication service exceeds a threshold established by the user. The processor 110 may also configured to provide the notification to the user indicating an availability of Wi-Fi wireless technology and a cost estimate associated with the Wi-Fi wireless technology. See also FIG. 3E.

Figure 2:
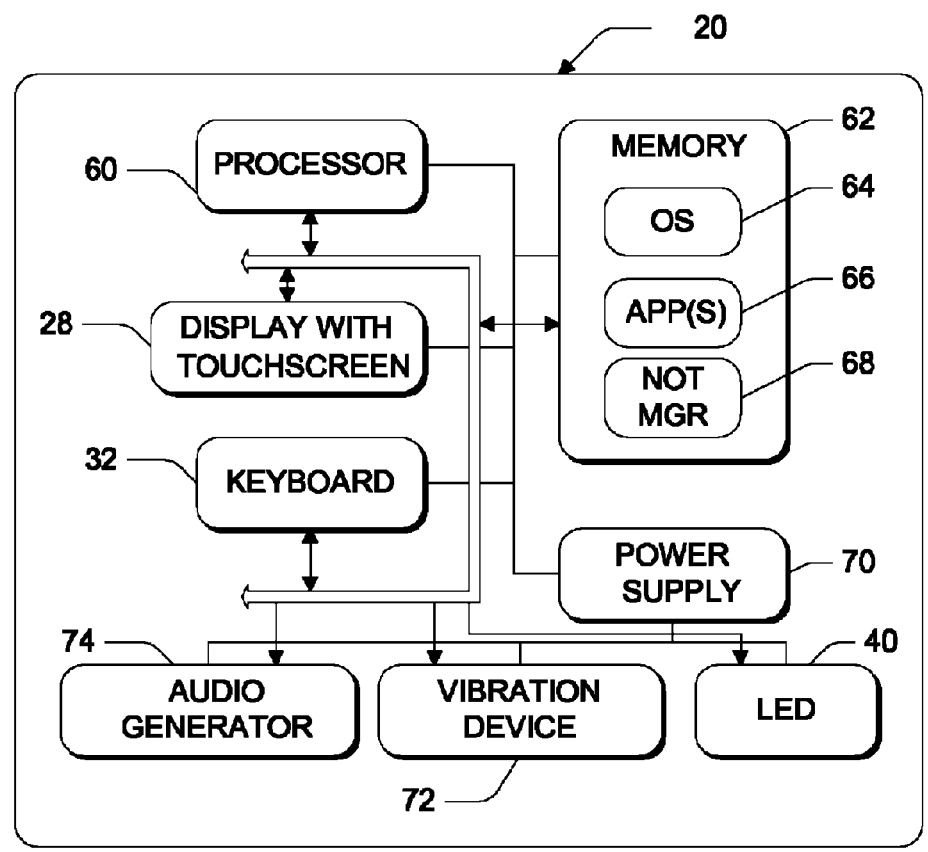
FIG. 2 is a block diagram illustrating an exemplary computing environment of a wireless telephone according to one embodiment of the invention.

FIG. 2 shows functional components of a wireless telephone 20 such as wireless telephone 116 of the invention which may be may be a handheld computing device, a personal digital assistant (PDA), a wireless messaging device, or the like. In another embodiment, the wireless telephone may be included in a general computing device or the like for receiving voice, text, or graphical messages. The wireless telephone has a processor 60, a memory 62, a display 28, and a keyboard 32. The memory 62 generally includes both volatile memory (e.g., RAM) and non-volatile memory (e.g., ROM, PCMCIA cards, etc.). An operating system 64 is resident in the memory 62 and executes on the processor 60. The wireless telephone 20 includes an operating system for controlling the allocation and usage of hardware resources such as the memory 62, the processor 60, disk space, and peripheral devices (e.g., keyboard 62).

One or more application programs 66 are loaded into memory 62 and run on the operating system 64. Examples of applications include email programs, scheduling programs, personal information management (PIM) programs, word processing programs, spreadsheet programs, Internet browser programs, and so forth. The wireless telephone 20 also has a notification manager 68 loaded in memory 62, which executes on the processor 60. The notification manager 68 handles notification requests from the applications 66.

The wireless telephone 20 has a power supply 70, which is implemented as one or more batteries. The power supply 70 might further include an external power source that overrides or recharges the built-in batteries, such as an AC adapter or a powered docking cradle.

The wireless telephone 20 is also shown with three types of external notification mechanisms: an LED 40, a vibration device 72, and an audio generator 74. These devices are directly coupled to the power supply 70 so that when activated, they remain on for a duration dictated by the notification mechanism even though the processor 60 and other components might shut down to conserve battery power. The LED 40 preferably remains on indefinitely until the user takes action. The current versions of the vibration device 72 and audio generator 74 use too much power for today's batteries, and so they are configured to turn off when the rest of the system does or at some finite duration after activation.

It is to be understood that other wireless, mobile or portable device other than the wireless telephone depicted in FIG. 2 may be used with departing from the scope of the invention.

Figure 4:
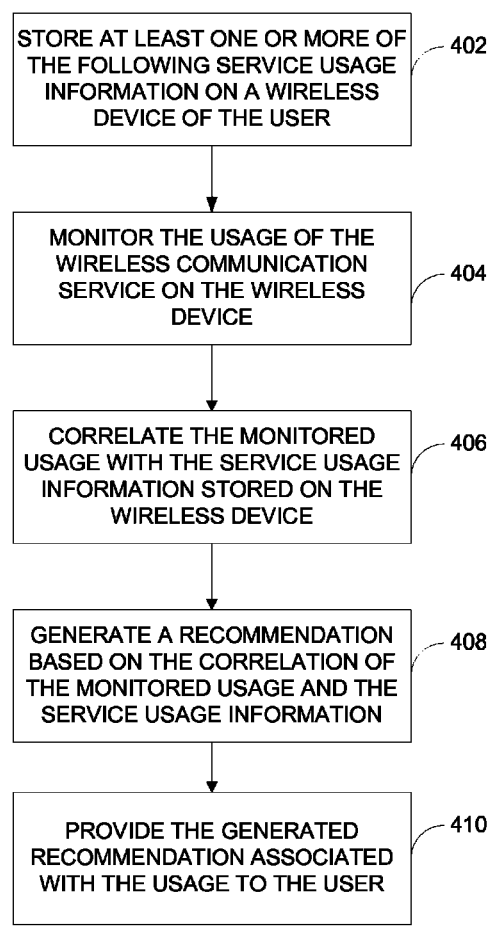
FIG. 4 is a flow diagram illustrating operations for providing dynamic recommendations associated with usage of a wireless communication service from a wireless device of a user according to an embodiment of the invention.

Referring now to FIG. 4, a flow chart illustrating operations for providing dynamic recommendations associated with usage of a wireless communication service from a wireless device of a user according to an embodiment of the invention. At 402, at least one or more of the following service usage information is stored on a wireless device (e.g., the wireless device 20 in FIG. 2) of the user: a service plan of the wireless communication service of the user, a service charge structure of a wireless communication service, a service coverage area of the wireless communication service provider (SP), a usage information of the wireless communication service of the user, and tariff information associated with the usage. At 404, the usage of the wireless communication service is monitored on the wireless device. The monitored usage is correlated with the service usage information stored on the wireless device. For example, the monitored usage is matched or compared with the service usage information stored on the wireless device. In an alternative embodiment, the monitored usage may be compared to service usage information retrieved or otherwise made available by the SP.

At 406, a recommendation is generated based on the correlation of the monitored usage and the service usage information. The generated recommendation provides a cost analysis of using the wireless communication service by the user. At 408, the generated recommendation associated with the usage is provided to the user such that the user may have an opportunity to make a more informed decision on the usage of the wireless device and its wireless services.

Figure 5:
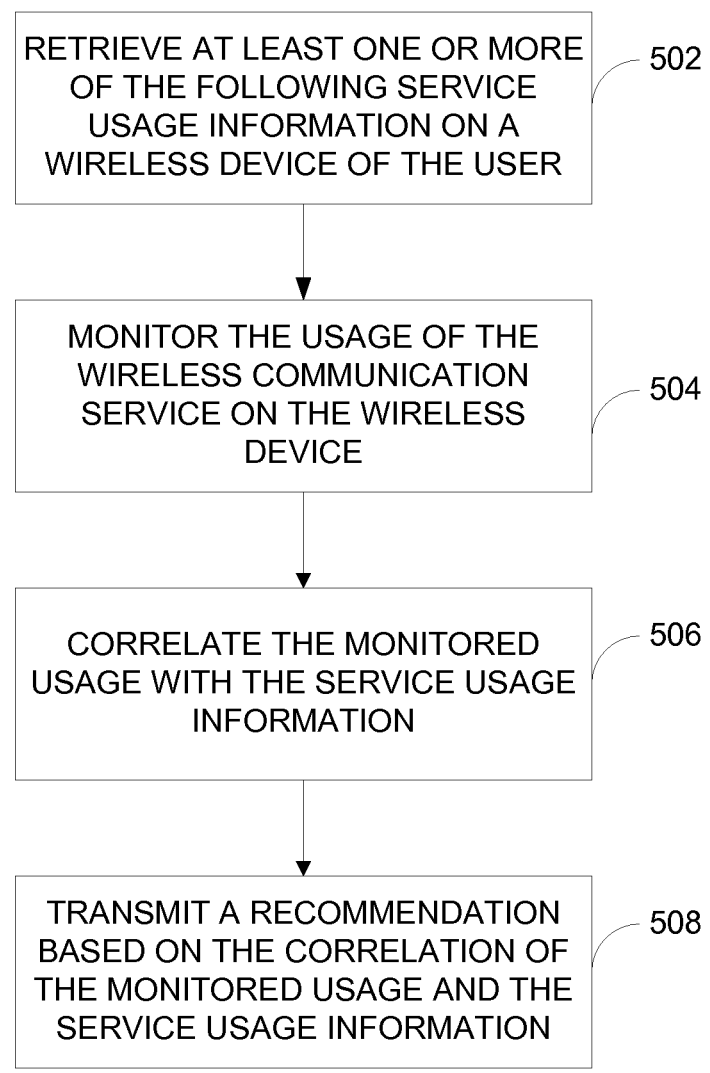
FIG. 5 is a flow diagram illustrating operations for providing dynamic recommendations associated with a user of a wireless communication service from a service provider (SP) of a user according to an embodiment of the invention.

In a further alternative embodiment, FIG. 5 illustrates operations of aspects of the invention from the perspective of a SP or a third party service provider according to an embodiment of the invention. In this embodiment, the SP or the third party service provider may retrieve at least one or more of the following service usage information on a wireless device of the user: a service plan of the wireless communication service of the user, a service charge structure of a wireless communication service, a service coverage area of the wireless communication service provider (SP), a usage information of the wireless communication service of the user, and tariff information associated with the usage at 502. In one embodiment, the SP may retrieve the service usage information from its own data store or the user account stored with the SP. In another embodiment, the third party service provider may retrieve the service usage information from other data source or from the SP. In an alternative embodiment, the user 104 may establish an account with the third party service provider for helping the user to manage and monitor the services described above. At 504, the usage of the wireless communication service on the wireless device is monitored. From the perspective of the SP, the SP may conveniently retrieve the usage information of the user 104 from its own data store. For the third party service provider, the third party service provider may request the user to provide such information manually or obtains the information from the wireless device, such as when the device is connected to or coupled with a computing device.

At 506, the monitored usage is correlated with or compared to the service usage information. Again, if the SP implements aspects of the invention, the SP may easily compare or correlate the monitored usage with the service usage information already available. The third party service provider may obtain the service usage information from the SP, the third party service provider may store such information under the user's account and may be used for the correlation or comparison. At 508, a recommendation based on the correlation of the monitored usage and the service usage information is transmitted or sent to the user on the wireless device. The transmitted recommendation provides a cost analysis of using the wireless communication service by the user. For example, the recommendation may arrive at the user's wireless device in the form of an automated message or a text message. In another embodiment, the SP or the third party service provider may transmit or send the recommendation to the user's e-mail address, instant messaging account.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for providing dynamic recommendations during usage of a wireless communication service from a wireless device of a user, said system comprising:

a memory area for storing at least one or more of the following service usage information: a service plan of the wireless communication service of the user, a service charge structure of a wireless communication service, a service coverage area of the wireless communication service provider (SP), a usage information of the wireless communication service of the user, and tariff information associated with the usage;

a processor having configured to execute computer-executable instructions for:

monitoring the usage of the wireless communication service, said monitoring comprising providing a notification in real time during said monitored usage and responsive to said monitored usage when the cost of the monitored usage of the wireless communication service exceeds an established threshold;

detecting whether the monitored usage is outside the service coverage area, said notification being indicative of the monitored usage being outside the service coverage area of the wireless communication SP of the user;

correlating the monitored usage with one or more tariffs available outside the service coverage area and comparing said one or more tariffs with the service usage information stored on the memory area;

generating a recommendation based on the correlation of the monitored usage, the one or more available tariffs, and the service usage information, said generated recommendation providing a cost analysis of using the wireless communication service by the user based on the most appropriate tariff; and terminating a connection between the wireless communication service and the wireless device of the user as a function of the detected usage, the monitored usage, and the service plan information; and an interface for providing the generated recommendation associated with the usage to the user and for providing the notification to the user during said monitoring.

2. The system of claim 1, wherein the memory area further stores service information relating to at least one service plan of a second SP, wherein the information relating to the at least one service plan of the second SP includes at least one or more of the following relating to the second SP: service plans, a service charge structure, a service coverage area, and tariff information.

3. The system of claim 2, wherein the processor is further configured to determine an estimate of a cost of the usage of the user based on the stored service information of the second SP.

4. The system of claim 1, wherein the notification includes an alert indicating to the user that the user is roaming outside the service coverage area and indicating a cost estimate associated with using the wireless service while the user is roaming outside the service coverage area based on at least one or more of the available tariffs.

5. The system of claim 1, wherein the processor is further configured to establish a history of usage by the user and wherein the interface provides a report of the history of usage to the user.

6. The system of claim 1, wherein the processor is further configured to provide the notification to the user indicating an availability of Wi-Fi wireless technology and a cost estimate associated with the Wi-Fi wireless technology.

7. A method for providing dynamic recommendations associated with usage of a wireless communication service from a service provider (SP) of a user, said method comprising:

retrieving at least one or more of the following service usage information on a wireless device of the user: a service plan of the wireless communication service of the user, a service charge structure of a wireless communication service, a service coverage area of the wireless communication service provider (SP), a usage information of the wireless communication service of the user, and tariff information associated with the usage;

monitoring the usage of the wireless communication service on the wireless device, said monitoring further comprising providing a notification during the monitored usage in response to the monitored usage;

determining whether the monitored usage is outside the service coverage area, said notification being indicative of the monitored usage being outside the service coverage area of the wireless communication SP of the user and the cost of the usage of the wireless communication service exceeding a threshold established by the user;

providing the notification to the user via an interface of the wireless device;

correlating the monitored usage with one or more tariffs available outside the service coverage area and comparing said one or more tariffs with the service usage information;

terminating a connection between the wireless communication service and the wireless device of the user as a function of the monitored usage, the one or more available tariffs, and the service plan information; and transmitting a recommendation to the interface of the wireless device based on the correlation of the monitored usage, the one or more available tariffs, and the service usage information, said transmitted recommendation providing a cost analysis of using the wireless communication service by the user.

8. The method of claim 7, wherein the notification includes an alert indicating to the user that the user is roaming outside the service coverage area and indicating a cost estimate associated with at least one of the one or more available tariffs using the wireless service while the user is roaming outside the service coverage area.

9. A method for providing dynamic recommendations associated with usage of a wireless communication service from a wireless device of a user, said method comprising:

storing at least one or more of the following service usage information on a wireless device of the user: a service plan of the wireless communication service of the user, a service charge structure of a wireless communication service, a service coverage area of the wireless communication service provider (SP), a usage information of the wireless communication service of the user, and tariff information associated with the usage;

monitoring the usage of the wireless communication service on the wireless device, said monitoring comprising providing an alert during said monitored usage indicating to the user that the user is roaming outside the service coverage area and indicating a cost estimate associated with using the wireless service while the user is roaming outside the service coverage area based on one or more tariffs available in the roaming area, said alert indicating that the cost of the monitored usage of the wireless communication service exceeds a threshold established by the user;

correlating the monitored usage with the service usage information stored on the wireless device;

terminating a connection between the wireless communication service and the wireless device of the user as a function of the monitored usage and the service plan information;

generating a recommendation based on the correlation of the monitored usage, the one or more tariffs available in the roaming area, and the service usage information, said generated recommendation providing a cost analysis of using the wireless communication service by the user; and providing the generated recommendation associated with the usage to the user.

10. The method of claim 9, wherein storing comprises storing service information relating to at least one service plan of a second SP, wherein the information relating to the at least one service plan of the second SP includes at least one or more of the following relating to the second SP: service plans, a service charge structure, a service coverage area, and tariff information.

11. The method of claim 10, further comprising determining an estimate of a cost of the usage of the user based on the stored service information of the second SP.

12. The method of claim 9, further comprising detecting whether the monitored usage is outside the service coverage area.

* * * * *